March 12, 1968   R. B. WALSH   3,372,563
APPARATUS FOR PRODUCING TUBING
Filed Jan. 27, 1964   3 Sheets-Sheet 1
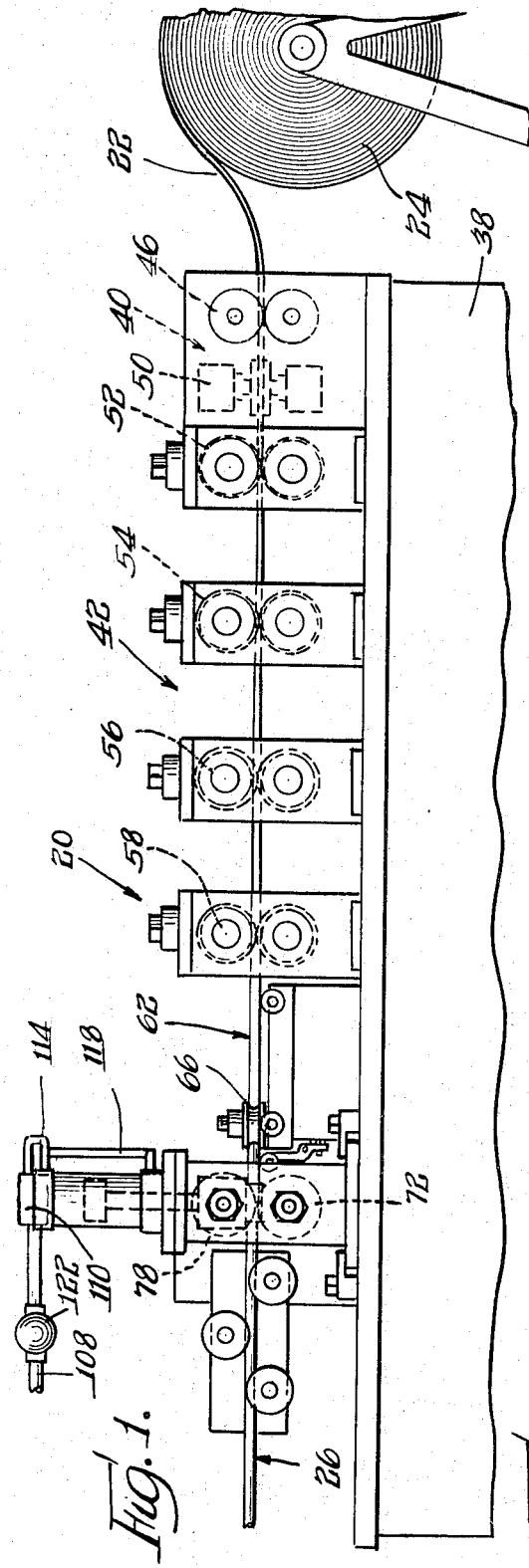
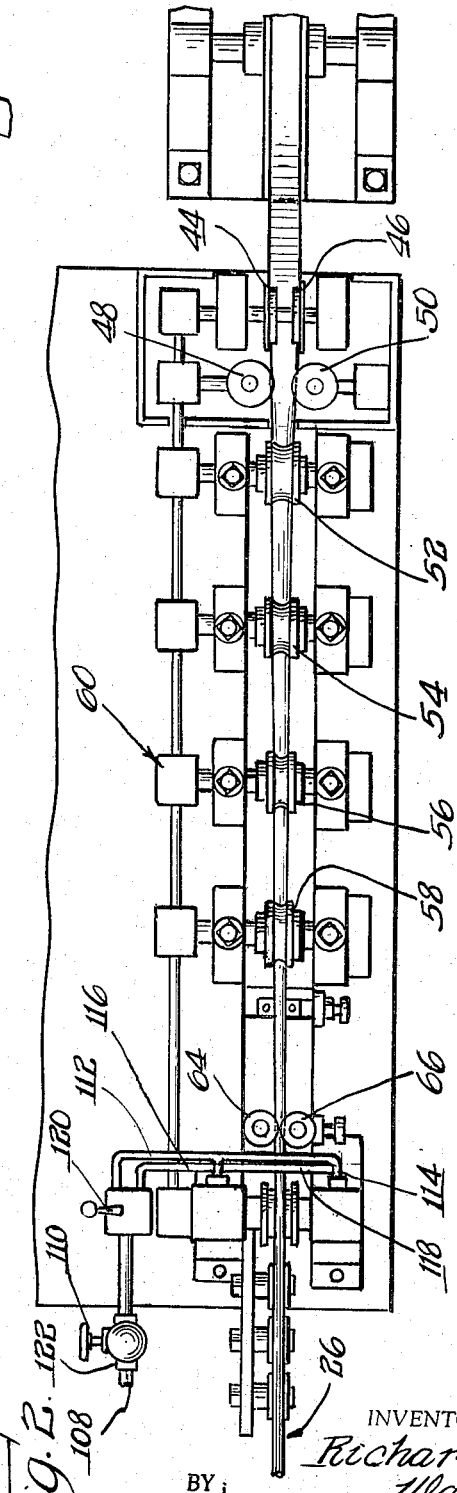
INVENTOR.
Richard B. Walsh
BY
Olson, Trexler, Wolters & Bushnell INVENTOR.
Richard B. Walsh

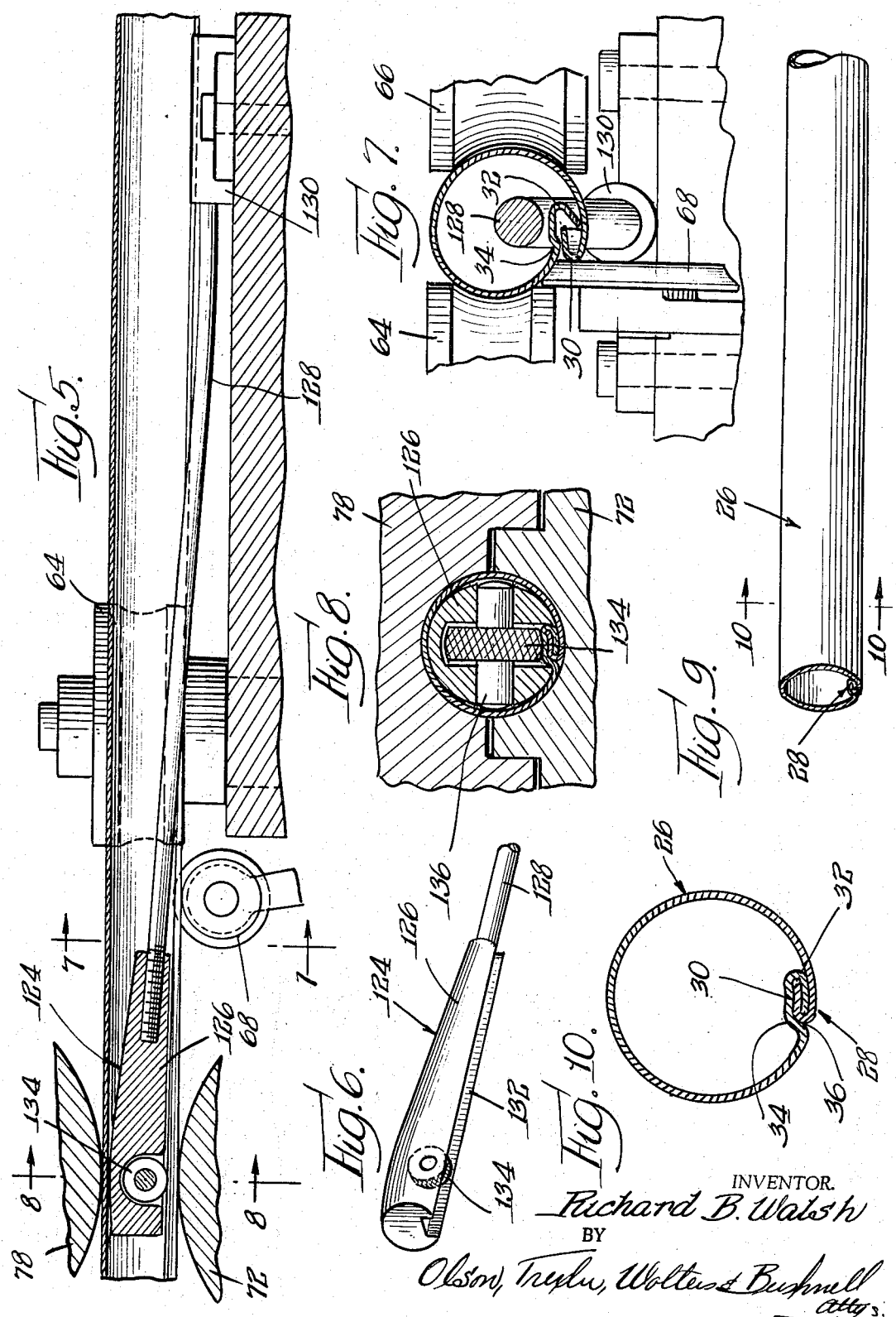

United States Patent Office 3,372,563
Patented Mar. 12, 1968

3,372,563
APPARATUS FOR PRODUCING TUBING
Richard B. Walsh, Round Lake, Ill., assignor to Quaker Industries, Inc., Antioch, Ill., a corporation of Wisconsin
Filed Jan. 27, 1964, Ser. No. 340,275
7 Claims. (Cl. 72—52)

The present invention relates to a novel apparatus for forming tubing, and more specifically to a novel apparatus for producing tubing from a strip of stock material.

While it will become apparent that features of the present invention may be utilized in the manufacture of tubing to be used for various purposes, it is contemplated that one use for such tubing is in the fabrication of metal furniture such as tray tables and the like. As is known, the production of tray tables and many other articles frequently requires the bending of the tubing, which tubing usually includes a hooked side seam. In the event the side seam of the tubing is not properly formed and crimped, the seam may open when the tubing is bent.

In view of the above, it is an important object of the present invention to provide a novel apparatus for producing tubing having a hooked side seam construction in a manner such that the side seam is properly and securely formed throughout the length of the tubing whereby to facilitate subsequent fabrication of the tubing into any desired article.

It has been found that when heretofore available tubing forming apparatus is used, variations in the thickness of the stock material from which the tubing is formed frequently cause either improper securing of the side seam portions of the tubing or jamming of the apparatus. Furthermore, it is contemplated that the tubing will be formed from relatively long strips of stock material drawn from a roll of the material. When the end of one roll is reached it has been the practice to weld the start of a second roll to the aforementioned end and this has caused the thickness of the material at the weld to be increased to such an extent that it has heretofore been necessary to retract side seam forming means and the like in the apparatus sufficiently to permit the weld to pass. Of course, this requires that the apparatus be readjusted and in addition the portions of the tubing passing through the apparatus while the forming means and tools are retracted are improperly formed. As a result substantial quantities of production time and materials have been lost.

It is a further important object of the present invention to provide a novel apparatus for producing tubing having a side seam, which apparatus is constructed for forming the side seam securely and properly regardless of variations in the thickness of the stock material from which the tubing is made.

Another important object of the present invention is to provide a novel apparatus for forming tubing constructed in a manner for accommodating joints between strips of sheet material stock without requiring loosening or adjustment of the apparatus whereby to eliminate substantially losses in production time and waste of material.

Other objects and advantages of the present invention will become apparent from the following description and the accompanying drawings wherein:

FIG. 1 is a fragmentary side elevational view showing an apparatus incorporating features of the present invention;

FIG. 2 is a fragmentary plan view of the apparatus shown in FIG. 1;

FIG. 5 is an enlarged fragmentary sectional view taken generally along line 5—5 in FIG. 2;

FIG. 6 is a fragmentary perspective view showing a mandrel incorporated in the apparatus of the present invention;

FIG. 7 is a fragmentary sectional view taken generally along line 7—7 in FIG. 5;

FIG. 8 is an enlarged fragmentary sectional view taken generally along line 8—8 in FIG. 5;

FIG. 9 is an elevational view showing a length of finished tubing constructed in accordance with the present invention; and FIG. 10 is an enlarged sectional view taken along line 10—10 in FIG. 9.

Figure 3:
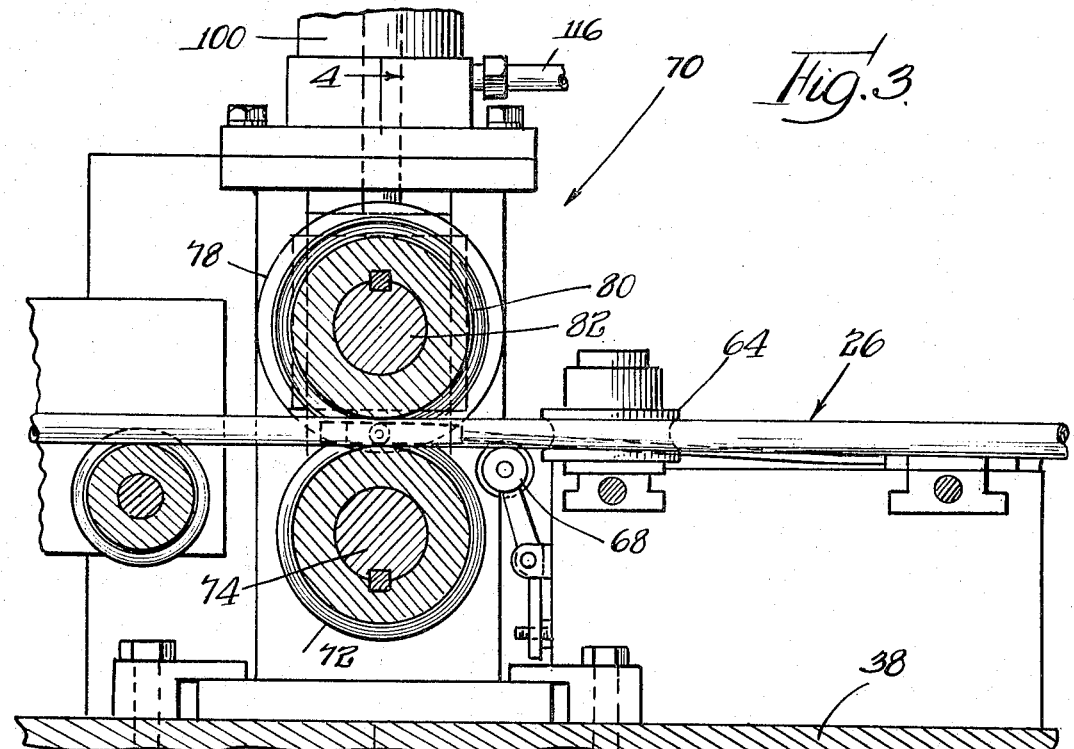
FIG. 3 is an enlarged fragmentary sectional view taken generally along line 3—3 in FIG. 4.

Referring now more specifically to the drawings wherein like parts are designated by the same numerals throughout the various figures, an apparatus 20 incorporating features of the present invention is shown in simplified form in FIGS. 1 and 2. As will be described more in detail below, the apparatus 20 is adapted to process a strip 22 of metal or other suitable material drawn from a supply roll 24 into a continuous length of tubing 26 shown best in FIGS. 9 and 10.

The tubing 26 is formed with a generally circular transverse cross sectional configuration and is provided with a longitudinally extending side seam 28. The side seam includes one longitudinally extending margin of the strip 22 bent to provide a hook 30 and an opposite longitudinally extending margin of the strip bent to provide a complementary hook 32. The hook 32 is offset inwardly as at 34 so that when the hook portions 30 and 32 are connected together as shown in FIG. 10 the exterior of the tube has a substantially smooth uninterrupted surface with the exception of a small longitudinally extending recess 36 at the point where an end of the hook portion 30 abuts against the offset portion 34. In accordance with the present invention the hook portions 30 and 32 are not only hooked together as shown in FIG. 10 but are also aggressively and securely crimped together so as to prevent the side seam 28 from opening, particularly when the tubing is bent or otherwise formed during the fabrication of a tray table or any other desired article. The apparatus is constructed for accomplishing the crimping of the hook sections 30 and 32 together uniformly regardless of any variations in the thickness of the material from which the tubing is being formed.

The apparatus 20 comprises a frame 38 on which roller means 40 is mounted for initially forming the hook portions 30 and 32 along opposite margins of the strip 22 and additional roller means 42 for progressively forming the strip into a tubular shape. The roller means 40 and 42 may be of various known constructions and need not be described in detail. It suffices to state that the roller means 40 may include sets 44 and 46 of upper and lower rollers mounted for rotation about generally horizontal axes and adapted to fold margins to the strip 22 downwardly and additional rollers 48 and 50 rotatable about generally vertical axes for completing the forming of the marginal portions of the strip into the hook-shaped configuration.

The roller means 42 also includes a plurality of sets 52, 54, 56 and 58 of upper and lower rollers spaced along the frame 38 and along the path of travel of the strip. As shown in Fig. 2, the rollers of the sets 52–58 have progressively increasingly concave peripheral surfaces for progressively bending or forming the strip into a generally tubular shape. In certain instances it may be desirable to increase the number of rollers of the means 42 in order to obtain the proper gradual bending action. The sets of rollers of the means 40 and 42 are operatively connected with each other and driven in timed relationship by transmission means 60 which also may be of known construction and need not be described in detail. It suffices to state that the transmission means may comprise any suitable arrangement and combination of drive shafts, gears, sprockets, drive chains and the like. Of course, a suitable prime mover, not shown, is provided for driving the transmission continuously so that the strip 22 is continuously drawn from the supply roll 24 and fed along the path of travel between the rollers.

The apparatus 20 further comprises means 62 mounted on the frame structure 38 adjacent the roller means 42 for manipulating the tubing for engaging the hook portion 30 within the hook portion 32. The means 62 comprises oppositely disposed rollers 64 and 66 adapted to compress the tubing sufficiently so that the hook portions 30 and 32 are disposed in overlapping relationship as shown in FIG. 7. In addition, another roller 68 is mounted for engaging beneath the tubing adjacent the hook portion 32 for deflecting the hook portion 32 upwardly sufficiently to enable the hook portion 30 to pass therebeneath as shown in Fig. 7. Then as the tubing passes beyond the rollers of the means 62 the inherent resiliency of the sheet material from which the tubing is formed causes the hook portion 30 to shift into full engagement with the hook portion 32.

Figure 4:
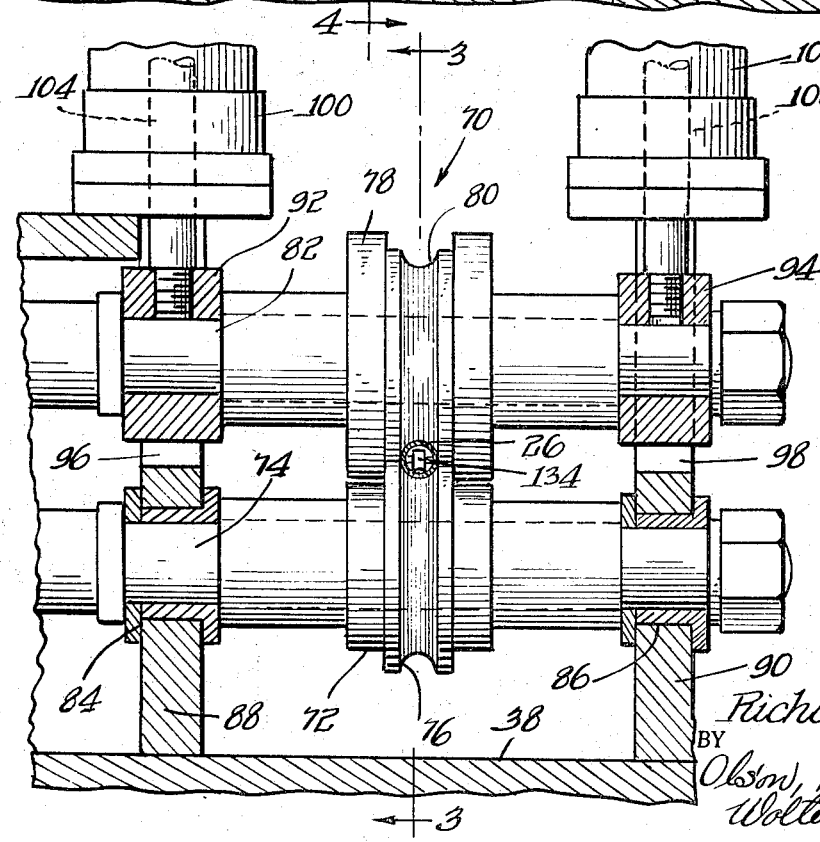
FIG. 4 is a fragmentary partial sectional view taken generally along line 4—4 in FIG. 3.

In order to crimp the hook portions of the tubing side seam together in the manner described above, the apparatus is provided with means 70 on the frame 38. This means comprises a first roller 72 on a shaft 74 and disposed for engaging beneath the tubing. The roller 72 has a peripheral groove 76 formed therein with a concave cross section having a radius substantially the same as the desired radius of the finished tubing. A second upper roller 78 is provided wtih a complementary peripheral groove 80 for engaging the top of the tubing, which roller 78 is mounted on a shaft 82. As shown best in Fig. 4, the lower roller shaft 74 is supported in bearings 84 and 86 which in turn are fixed in upstanding frame members 88 and 90 mounted on and secured in fixed relationship with respect to the main frame 38. The upper roller shaft 82 is also supported by bearing members 92 and 94 at opposite sides of the roller. However, it is to be noted that the bearing blocks 92 and 94 are respectively vertically slidably disposed in guide slots 96 and 98 formed in the upstanding frame members 88 and 90 whereby the roller 78 is adapted to be moved vertically toward and away from the lower roller 72 in the manner described below. Preferably the roller shafts of the means 70 are operatively connected to and driven by the transmission 60 and are, therefore, continuously driven in timed relationship with respect to the other driven rollers of the apparatus.

The bearing blocks 92 and 94 are supported for enabling the roller 78 to be resiliently yieldably urged toward the lower roller 72 and thus against the tubing with a predetermined substantially uniform force. More specifically, pneumatic cylinders 100 and 102 are fixedly mounted at upper ends of the upstanding frame members 88 and 90. Vertically shiftable pistons 104 and 108 respectively associated with the cylinders have lower ends connected to the bearing blocks 92 and 94. Means is provided for supplying fluid or air under pressure to upper ends of the cylinders above the pistons for urging the pistons downwardly and thereby forcing the roller 78 toward the roller 72 with a predetermined force in accordance with the fluid pressure.

As shown in Figs. 1, 2 and 3, fluid or air under pressure may be directed from any suitable source of supply through a conduit 108 to a control valve 110 mounted at any desired location. The valve 110 has one outlet connected by branch lines 112 and 114 to upper ends of the cylinders and another outlet connected by branch lines 116 and 118 to lower ends of the cylinders. A control handle 120 or any other suitable means may be provided for actuating the valve 110 for selectively directing fluid under pressure to the upper ends of the cylinders for urging the roller 78 against the tubing and for directing the air to the lower ends of the cylinders for retracting the roller 78. In addition, an adjustable pressure regulating valve 122 is connected in the conduit 108 for enabling an operator to control the pressure of the fluid introduced into the cylinders and thus the pressure with which the roller 78 is urged against the tubing.

The side seam crimping means further includes a mandrel 124 shown best in FIGS. 3 and 5-8 adapted to extend within the tubing and between the rollers 72 and 78. The mandrel comprises an elongated tapered body 126 which is anchored by an elongated rod 128 adapted to extend rearwardly and out of the tubing through the slot between the hook portions 30 and 32 thereof at a location prior to the joining of the hook portions. The rod 128 is in turn fixed by an anchor member 130 mounted on the frame of the apparatus.

The mandrel body 126 is tapered so as to facilitate the passage of the tubing therearound. However, the cross sectional dimensions in configuration of the mandrel in a plane which contains the axes of the rollers 72 and 78 is closely similar to the internal cross sectional dimensions and configuration of the finished tubing as indicated in FIG. 8. A lower side of the mandrel is provided with an elongated recess or slot 132 for accommodating the side seam of the tubing. In addition, a roller 134 is mounted on a shaft 136 secured between portions of the mandrel body at opposite sides of the slot. The roller 134 is proportioned and positioned so that the lower side thereof is adapted to be thrust against the inner surface of the side seam when the roller 78 is pressed downwardly against the tubing which in turn presses downwardly against the upper side of the mandrel body 126. In other words downward pressure of the roller 78 against the tubing causes the roller 134 to be forced against the inner surface of the tubing side seam so that the side seam is rolled and crimped between the roller 134 and the roller 72.

As previously indicated, it is important that the crimping of the side seam which is accomplished by rolling the side seam between the rollers 72 and 134 be carried out aggressively and uniformly throughout the length of the tubing. The apparatus of the present case accomplishes this result regardless of the variations in the thickness of the material from which the side seam is formed since the roller 78 is constantly and resiliently yieldably biased by the pneumatic or fluid pressure means downwardly against the tubing. Thus if during a tubing forming operation a section of the tubing having a material thickness greater than other portions of the tubing passes between the rollers 72 and 78, the relatively thick portion of the side seam tends to force the mandrel upwardly and this in turn tends to force the roller 78 upwardly. Such upward movement of the roller 78 is permitted by the fluid pressure cylinder piston means while at the same time the fluid pressure within the cylinders which have a relatively large volume as compared with any displacement of the cylinders under these conditions, remains substantially constant so that a substantial uniform crimping pressure is applied to the side seam. Of course, upon the passing of the relatively thick portion of the side seam, the fluid pressure causes the roller 78 to move downwardly whereby the relative thinner portions of the side seam are properly crimped. In other words, the structure is such as to enable the roller 78 to move up and down in response to any variation in the thickness of the sheet material stock while at the same time continuously applying a substantially uniform pressure to the tubing. It will be appreciated that this not only enables the side seam to be uniformly formed throughout the length of the strip in the supply roll 24, but also enables the apparatus to accommodate relatively great increases in material thickness which may occur when a second strip of stock material is welded or otherwise joined to an end of the first strip. Thus aditional strips of stock material may be fed through the apparatus without requiring the apparatus to be shut down or adjusted in a manner which precludes proper forming of the tubing.

While a preferred embodiment of the present invention has been shown and described herein, it is obvious that many structural details may be changed without departing from the spirit and scope of the appended claims.

The invention is claimed as follows:

1. An apparatus for forming tubing from a strip of material continuously advancing along a predetermined path of travel comprising a series of means adjacent said path of travel for forming hook portions along opposite margins of the strip and for curling the strip toward a generally tubular condition and interengaging said hook portions, means adjacent said path of travel for crimping said interengaged hook portions together for forming a tubing side seam, said last named means comprising first and second rollers mounted at a fixed location for engaging opposite outer sides of the tubing, a shaft supporting said first roller and extending laterally from opposite sides thereof, a pair of shiftably disposed members respectively supporting said shaft at opposite sides of said first roller, a mandrel anchored for extending within the tubing between said rollers, and pneumatic means resiliently yieldably urging said first roller toward the other with a predetermined substantially constant force for enabling said first roller to accommodate any variations in material thickness of the strip, said pneumatic means comprising a pair of cylinder and piston means respectively connected with said shaft at opposite sides of said first roller.

2. An apparatus, as defined in claim 1, which includes means connected with opposite ends of said cylinder means selectively for introducing fluid under pressure into first ends of said cylinder means for urging said first roller toward the other roller and for introducing fluid under pressure into opposite ends of said cylinder means for retracting said first roller from the other roller.

3. An apparatus, as defined in claim 2, which includes means connected with said means for selectively introducing the fluid under pressure to the cylinder means for controlling the pressure of the fluid.

4. An apparatus, as defined in claim 1, wherein said mandrel includes a roller engageable within an inner surface of the tubing side seam at a location between said first and second rollers.

5. In an apparatus for forming a strip of stock material into tubing having hook-shaped longitudinally extending marginal portions hooked together for providing a tubing side seam, means for pressing the hook-shaped marginal portions together for finishing the side seam comprising first and second peripherally opposed rollers having annular concave surfaces engageable with opposite outer sides of the tubing, a mandrel anchored for extending within the tubing between said rollers, means resiliently yieldably urging at least one of said rollers toward the other with a predetermined force for pressing the tubing side seam between said other roller and said mandrel and for enabling said one roller to accommodate any variations in material thickness of the strip, a shaft supporting said other roller, fixed bearings supporting said shaft, a second shaft supporting said one roller and extending from opposite sides thereof, first and second bearing members rotatably supporting said second shaft at opposite sides of said one roller, guide means engageable with said first and second bearing members for guiding said members for parallel movement toward and away from said first mentioned shaft, and said means resiliently urging said one roller toward the other comprising a pair of pneumatic cylinder and piston means respectively connected to said first and second bearing members.

6. An apparatus, as defined in claim 5, which includes means for introducing air under a predetermined substantially constant pressure to said cylinder means for urging said one roller toward the other roller under a substantially constant force.

7. An apparatus, as defined in claim 5, wherein said mandrel comprises a roller disposed for engaging an inner surface of said side seam oppositely from one of said first and second rollers.

References Cited

UNITED STATES PATENTS

| 1,355,282 | 10/1920 | Smith | 72—52 |
| 1,461,848 | 7/1923 | Jaquiery | 72—52 |
| 1,964,407 | 6/1934 | Phillips | 72—52 |
| 2,621,621 | 12/1952 | Kaiser | 72—51 |
| 2,967,500 | 1/1961 | Lawrence | 72—52 |
| 3,068,933 | 12/1962 | Klar | 72—453 |

FOREIGN PATENTS 808,320  2/1959  Great Britain.

RICHARD J. HERBST, *Primary Examiner.*

CHARLES W. LANHAM, *Examiner.*